(12) United States Patent
Muench, Jr. et al.

(10) Patent No.: US 6,338,637 B1
(45) Date of Patent: Jan. 15, 2002

(54) DEAD FRONT SYSTEM AND PROCESS FOR INJECTING FLUID INTO AN ELECTRICAL CABLE

(75) Inventors: Frank J. Muench, Jr., Waukesha; John M. Makal, Menomonee Falls; James A. Wenzel, Sullivan, all of WI (US)

(73) Assignee: Cooper Industries, Houston, TX (US)

( * ) Notice: Subject to any disclaimer, the term of this patent is extended or adjusted under 35 U.S.C. 154(b) by 0 days.

(21) Appl. No.: 09/563,021

(22) Filed: May 2, 2000

Related U.S. Application Data

(63) Continuation of application No. 08/886,163, filed on Jun. 30, 1997.

(51) Int. Cl.[7] ............................................. H01R 4/64
(52) U.S. Cl. .................................................. 439/201
(58) Field of Search ............................... 439/88, 190, 912, 439/921, 206, 89, 181, 183, 184, 185, 198, 205; 200/50 AA, 50 A, 144 B

(56) References Cited

U.S. PATENT DOCUMENTS

| | | |
|---|---|---|
| 1,877,586 A | 9/1932 | Rah |
| 1,902,617 A | 3/1933 | Burr |
| 1,988,824 A | 1/1935 | Austin |
| 1,998,766 A | 4/1935 | Mample |

(List continued on next page.)

OTHER PUBLICATIONS

Cooper Power Systems, 600k A Molded Rubber product Application, Mar. 1996, Bulletin 96011.

Cooper Power Systems, Molded Rubber Products 200 A 35 kV Class Three–Phase Loadbreak Elbow Connector, January 1990, 500–46.

*Primary Examiner*—Brian Sircus
*Assistant Examiner*—J. F. Duverne
(74) *Attorney, Agent, or Firm*—Fish & Richardson

(57) ABSTRACT

A dead front system provides fluid access to an electrical connector and cable. The dead front system includes an injection plug, a fluid access system, and a tube connected at a first end to the injection plug and at a second end to the fluid access system. The injection plug, fluid access system, and tube are surrounded by a conductive, grounded surface.

31 Claims, 7 Drawing Sheets

U.S. PATENT DOCUMENTS

| | | |
|---|---|---|
| 1,999,771 A | 4/1935 | Mample |
| 2,043,227 A | 6/1936 | Bennett |
| 2,071,102 A | 2/1937 | Atkinson et al. |
| 2,189,610 A | 2/1940 | Lingal et al. |
| 2,228,440 A | 1/1941 | Chubbuck |
| 2,261,742 A | 11/1941 | Matsumoto |
| 2,289,176 A | 7/1942 | Burr et al. |
| 2,379,942 A | 7/1945 | Webber |
| 2,401,595 A | 6/1946 | Wetherill |
| 3,324,449 A | 6/1967 | McLoad |
| 3,376,541 A | 4/1968 | Link |
| 3,509,516 A | 4/1970 | Phillips |
| 3,509,518 A | 4/1970 | Phillips |
| 3,513,425 A | 5/1970 | Arndt |
| 3,534,323 A | 10/1970 | Becker et al. |
| 3,555,487 A | 1/1971 | Jones |
| 3,568,136 A | 3/1971 | Wells |
| 3,585,568 A | 6/1971 | Hervig et al. |
| 3,588,781 A | 6/1971 | Williams |
| 3,617,987 A | 11/1971 | Sankey |
| 3,624,594 A | 11/1971 | Trimble et al. |
| 3,630,281 A * | 12/1971 | Fast et al. .................... 102/304 |
| 3,649,952 A | 3/1972 | Harmon |
| 3,678,432 A | 7/1972 | Boliver |
| 3,711,818 A | 1/1973 | Swehla |
| 3,725,846 A | 4/1973 | Strain |
| 3,736,505 A | 5/1973 | Sankey |
| 3,753,203 A | 8/1973 | Link |
| 3,793,614 A | 2/1974 | Tachick et al. |
| 3,818,407 A | 6/1974 | Edgerton |
| 3,853,375 A | 12/1974 | McClain |
| 3,860,322 A | 1/1975 | Sankey et al. |
| 3,868,164 A | 2/1975 | Lisk |
| 3,883,208 A | 5/1975 | Sankey et al. |
| 3,980,374 A | 9/1976 | Fallot |
| 4,060,785 A | 11/1977 | Hanke et al. |
| 4,152,643 A | 5/1979 | Schweitzer, Jr. |
| 4,154,993 A * | 5/1979 | Kumbera et al. ......... 200/50 A |
| 4,175,815 A | 11/1979 | Andersen et al. |
| 4,202,591 A | 5/1980 | Borgstrom |
| 4,758,171 A | 7/1988 | Hey |
| 4,824,342 A * | 4/1989 | Buck .......................... 417/503 |
| 4,865,559 A | 9/1989 | Clabburn |
| 4,904,932 A | 2/1990 | Schweitzer, Jr. |
| 4,946,393 A | 8/1990 | Borgstrom et al. |
| 5,082,449 A | 1/1992 | Borgstrom et al. |
| 5,215,475 A | 6/1993 | Stevens |
| 5,221,220 A | 6/1993 | Roscizewski |
| 5,393,240 A | 2/1995 | Makal et al. |
| 5,419,183 A * | 5/1995 | Key .......................... 73/49.5 |
| 5,573,410 A | 11/1996 | Stepniak |

* cited by examiner

DEAD FRONT SYSTEM AND PROCESS FOR INJECTING FLUID INTO AN ELECTRICAL CABLE

CROSS REFERENCE TO RELATED APPLICATIONS

This application is a continuation of U.S. application Ser. No. 08/886,163, titled "HIGH VOLTAGE ELECTRICAL CONNECTOR WITH ACCESS CAVITY, AND INSERTS FOR USE THEREWITH", filed Jun. 30, 1997.

TECHNICAL FIELD

The invention relates to injecting fluid into an electrical cable.

BACKGROUND

High voltage electrical connectors are used in forming circuits connecting electrical equipment, such as transformers and circuit breakers, to distribution systems and the like through high voltage cables typically having 15 to 35 kV of electric potential. The connectors are configured such that at least one of the cables may be disconnected easily from one of the connectors to create a break in the circuit.

The connectors must be handled by service personnel while powered, which means there is some risk that the connector and disconnecting cable may experience corona discharges and other electrical discharges. For this reason, the connectors include many safety features to minimize the risk of injury and the chance of structural damage to the connector and to other nearby equipment.

A conventional high voltage electrical connector, often referred to as an elbow connector, includes a cable connector assembly within the body of the elbow connector for interconnecting or electrically coupling one cable within the high voltage electrical connector to a mating electrical contact structure of an associated, mating bushing. The mating bushing is, in turn, electrically connected or coupled to a transformer or other piece of electrical equipment. The cable connector assembly is surrounded by an insulative dielectric material, except for openings providing access to the internal connector assembly. The insulative dielectric material is surrounded by a conductive shield, which may be in the form of a molded boot. The conductive shield is electrically connected to ground so that any voltage which may form on the surface of the insulative dielectric material or any electrical discharge near the connector is immediately dissipated to ground.

In many instances, it is desirable to have access to the interior of the high voltage electrical connector. For example, it is often desirable to vent gases from the interior of the connector, conduct tests on the interior cable connector assembly, or take measurements from within the connector. Thus, a high voltage electrical connector may include an access hole extending from the outside of the connector and through the insulative material to expose the internal cable connector assembly.

The cable connected to the connector typically includes a continuous, cylindrical insulative sheath surrounding the high voltage conductive interior of the cable. This insulative sheath is surrounded by a grounded conductive sheath of metallic wires located on the exterior of the cable. The conductive sheath keeps the cable at ground potential, ties all neutrals together, and provides a return path for any fault current that may flow due to cable failure.

A connector access hole may be used to inject an insulative liquid into the connector and the cable extending from the connector to improve the dielectric strength of insulative material within the connector and the cable. This insulative liquid restores damaged insulation to rejuvenate the connector and the cable. Restoring the damaged insulation serves to prevent cable failure that may occur if water or other contaminants enter and deteriorate the insulative sheath of the cable. The insulative liquid may be injected into the connector and forced along the entire length of the cable. After injection, the insulative liquid penetrates the molecular structure of the cable insulation and cures in place. This re-establishes the original dielectric strength of the cable to substantially reduce the potential for cable failure.

Regardless of the reason for requiring access to the interior of the connector, one serious potential problem associated with conventional connectors is that arcing or corona discharges may occur when attempting to use the access hole. This may occur, for example, when insulative fluid is injected into the electrical connector and the attached cable through the access hole.

A conventional high voltage electrical connector includes a projection of insulative material extending from the grounded conductive shield of the connector body. See, eg., U.S. Pat. Nos. 4,946,393 and 5,082,449. The access hole is formed in this projection. Because the insulative projection represents a break in the grounded conductive shield, a separate conductive cap of elastomeric material is configured to fit over the insulative projection and abut against the conductive shield of the body to maintain the integrity of the grounded shield. Typically, an insulating rod attached to the conductive cap extends into the access hole when the cap is in place. To this end, the cap includes a cavity for receiving a head of the insulating rod in an interference fit to attach the two components to each other. When the cap is positioned over the insulative projection, the insulating rod fits within the access hole in an interference fit to provide a dielectric seal.

When the cap and the attached rod are removed from the projection, the dielectric seal is broken and the insulative projection is exposed such that there is a large break in the grounded conductive shield. Capacitive coupling may result in this exposed insulative projection having a high electric potential, especially near the base of the projection, even though the insulative material may have excellent dielectric characteristics. Thus, when the cap is removed from the insulative projection, the surface of the projection may be floating at a voltage higher than ground. This voltage may cause corona discharges.

After the cap and rod have been removed, an injection port may be inserted into the access hole. Corona discharges may occur during this insertion process because the insulative projection is exposed without a ground shield and the dielectric seal has been broken.

The injection port permits a gas or liquid to be injected into or removed from the interior of the connector or cable through the hole formed in the injection port. Conventional injection ports are formed from an insulative material and are sized to fit within the access hole to provide a dielectric seal, such as the seal provided by the insulating rod. Conventional injection ports do not include a grounded shield.

Before or after insertion of a conventional injection port into the access hole, a hose or similar item is connected to a hose connector on the injection port so that the desired maintenance, fluid injection, or tests may be initiated. Because the injection port is not covered with a grounded shield, the surface of the insulating projection and the hose connector may have a dangerous electric potential. This potential may cause arcing. Furthermore, the opportunity for a high surface voltage due to capacitive coupling is enhanced because the liquid, gas or contaminants within the cable that are removed from the electrical connector or cable may be good conductors.

Conductive gases or liquids exiting from the injection port also may result in electrical arcing directly out of the hole in the injection port, with the arcing originating in the high voltage internal components of the connector. Because the injection port has no conductive shield, dielectric breakdown of the surrounding air may occur, resulting in arcing to the external surface of the electrical connector and/or other external items, and thereby causing damage or injury.

Thus, when a conventional conductive cap is on an insulative projection with the attached insulating rod properly placed in the access hole, the ground shield and dielectric seal are operable and capacitive coupling to the surface of the insulating material does not pose a problem. However, when the cap and rod are removed, the insulative projection of the connector is exposed and may have a dangerous electric potential. Furthermore, when the cap and rod are replaced with an injection port, the entire surface of the injection port may float at some voltage significantly higher than ground, such that a serious risk of electrical discharges exists when attempting to service the electrical connector through the injection port.

SUMMARY

In one general aspect, a dead front system for providing fluid access to an electrical connector and cable includes an injection plug, a fluid access system, and a tube connected at a first end to the injection plug and at a second end to the fluid access system. The injection plug, fluid access system, and tube are surrounded by a conductive, grounded surface.

Embodiments may include one or more of the following. For example, the conductive, grounded surface may include a conductive container or sack, such as a metal mesh container or bag, which contains the fluid access system. The container may be flexible or rigid. The conductive, grounded surface also may include conductive surfaces formed on outer surfaces of the injection plug, the tube, and the fluid access system, which surfaces may be in the form of coatings. In general, the conductive surface and conductive container or sack are electrically connected to each other and to system ground.

The conductive outer surface may be removed from a portion of the first end of the tube that is inserted into a channel in the injection plug. The connection between the tube and injection plug may further include a coating between the inserted portion of the first end of the tube and the channel. The coating may be an adhesive.

The dead front system also may include a tapered collar surrounding the tube and a conductive nut that secures the tapered collar and the tube to the injection plug so that the tapered collar forms a seal against the injection plug. The conductive nut may be made of an insulating plastic coated with a conductive layer.

The dead front system's fluid access system may include a chamber made from an insulative material, a fluid control system, and a housing. The fluid control system controls the flow of fluid between the chamber and the tube, and may include valves and active components, such as a pump. The housing surrounds the fluid control system and is made from an insulative material. The chamber and the housing may include integral ground shields connected to the system ground. The integral ground shields may include conductive coatings.

The dead front system provides considerable advantages. For example, the system does not have exposed voltages on the exterior of any parts during the process of filling a cable with fluid. This significantly reduces the risk of shock or injury to service personnel, or damage to equipment in proximity of the dead front system during use of the system. In addition, there also are advantages obtained when all of the components in the dead front system's conductive sack are provided with a conductive integral ground shield because the shield drains off surface charges without audible or visible display.

Other features and advantages will be apparent from the following description, including the drawings, and from the claims.

DETAILED DESCRIPTION

Figure 1:
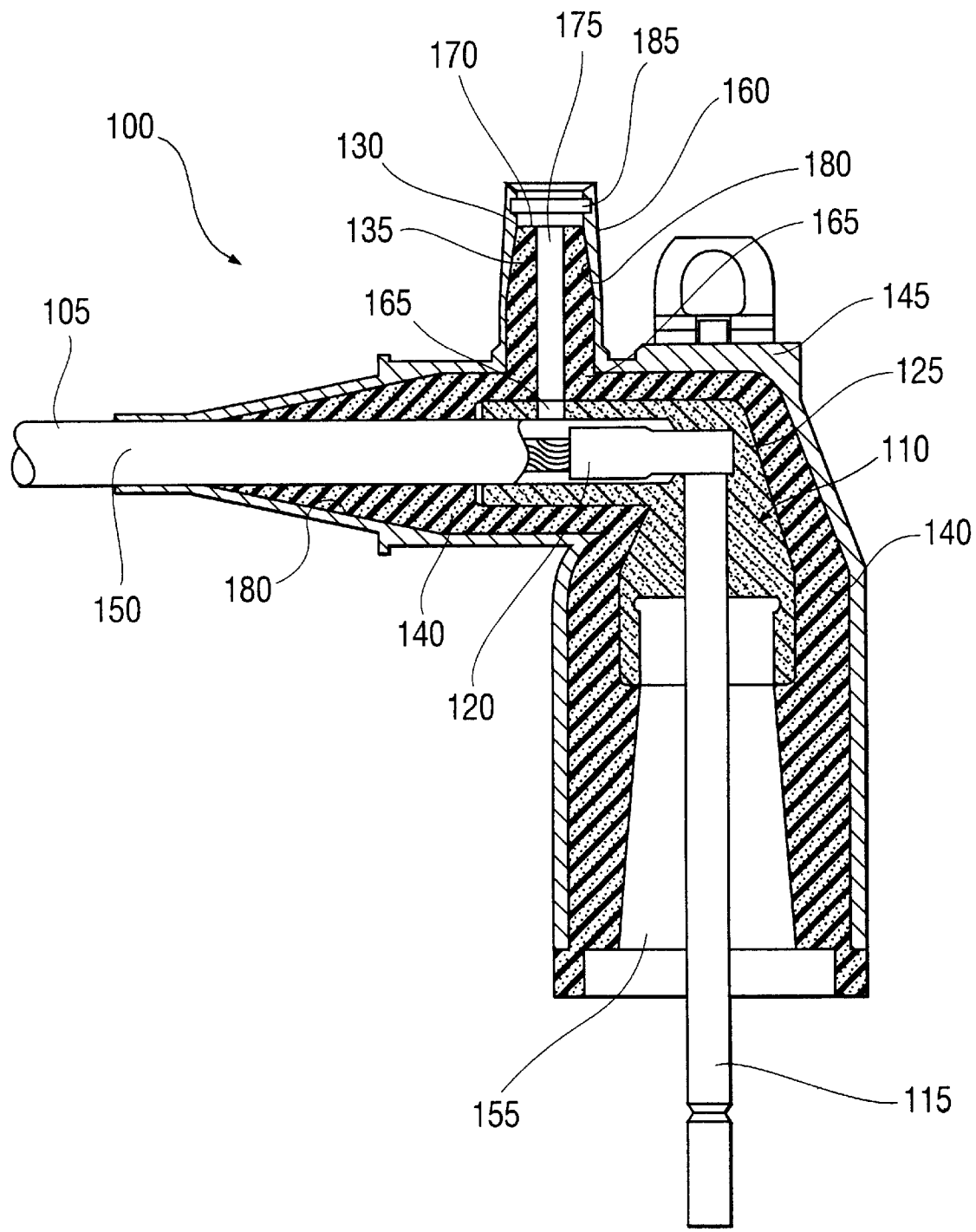
FIG. 1 is a side view of a high voltage connector.

Referring to FIG. 1, a high voltage electrical connector 100, referred to as an elbow connector, connects a high voltage cable 105 to a transformer, circuit breaker, or other high voltage electrical component (not shown). Voltages applied to the cable may be on the order of 10 to 45 kV, and more typically are on the order of 15 to 35 kV. A conductor coupling assembly 110 located within the connector provides the electrical connection to the cable. The conductor connector assembly 110 couples conductive strands of the cable 105 to a probe 115.

The conductor coupling assembly 110 includes a crimp-type or compression connector 120 for coupling the conductive strands of the cable 105 to the probe 115. The probe 115 is threaded into one end of the compression connector 120. The probe 115 mates with a female connector device of an associated bushing, allowing easy connection and disconnection of the connector 100 to energize and de-energize the cable 105. The probe 115 is easily separable from the electrical connection device within the connector 100 such that the electric connector is commonly referred to as being a "separable" connector.

A semiconductive insert 125, also referred to as a faraday cage, surrounds the crimp connector 120 and the base of the probe 115. The faraday cage 125 has the same electric potential as the cable 105 and the probe 115. The faraday cage 125 prevents corona discharges within the conductor coupling assembly 110.

The connector 100 includes an insulative projection 130 having an access cavity 135 providing access to the interior of the electrical connector 100. The connector also includes a body portion 140 and an external conductive shield 145 molded from a conductive elastomeric material, such as a terpolymer elastomer made from ethylene-propylene diene monomers loaded with carbon, and/or other conductive materials. A preferred conductive material is carbon-loaded ethylene-propylene terpolymer (EPT or EPDM). The conductive external shield 145 may be pre-molded in a shape of an elbow and includes a cable opening 150 for receiving a high voltage cable, and a connector opening 155 for receiving an electrical connection device. The conductive external shield 145 partially surrounds the body portion 140.

The body portion 140 is made from an insulative material, such as EPDM. The body portion 140 surrounds the semiconductive insert 125 of the conductor coupling assembly 110, and is partially surrounded by the conductive external shield 145. The insulative body portion 140 forms a dielectric and electrically insulative barrier between the high voltage internal components and the conductive external shield 145. The insulative body portion 140 also includes openings for receiving the high voltage cable 105 and an electrical connection device so that they may be electrically connected to the conductor coupling assembly 110 within the interior of the electrical connector 100.

The access cavity 135 permits access to the interior of the electrical connector 100. The access cavity 135 is located in the insulative projection 130, which extends from the body portion 140. The access cavity 135 is a straight hole extending from the exterior of the electrical connector 100 through the insulative projection 130 and into the insulative body 140 to expose the interior of the conductor coupling assembly 110. The access cavity 135 may be inclined with respect to the conductive external shield 145, and may be conical, square, triangular, oval, or of other shape, so long as it exposes the interior of the high voltage electrical connector 100. A pre-molded conductive boot 160, referred to as the projection conductive external shield, covers the insulative projection 130.

The projection 130 and the access cavity 135 are located near the female connector, and the access cavity includes an opening 165 in the interior of the female connector of the conductor coupling assembly 110. However, the access cavity 135 and the insulative projection 130 may be located at other locations on the electrical connector 100.

The projection conductive external shield 160 is positioned over the area of the electrical connector 100 in which the access cavity 135 is to be located. The projection external conductive shield 160 is fixedly or permanently secured to the body portion conductive external shield 145 such that it is not readily removable or detachable. To this end, the projection external conductive shield 160 may be formed integrally with the conductive external shield 145 by one molding process, or they may each be formed separately and then permanently attached to each other by welding, gluing, or other means that electrically and physically couple the two shields to each other.

After the projection external conductive shield 160 is properly located, the body portion conductive external shield 145 and the projection conductive external shield 160 are filled with an insulative material to form the body portion 140 and the insulative projection 130. The insulative projection 130 may be formed in a separate step from the body portion 140, or the projection and the body portion may be formed in one step such that they are integral with each other. Typically, the projection 130 and the body portion 140 are formed from the same insulative material. However, they also may be formed from different insulative materials.

After the insulative projection 130 has been formed, the access cavity 135 is formed in the center of the insulative projection by, for example, removing a prepositioned mandrel from the insulative material. The access cavity 135 may be formed by other methods. For example, the access cavity 135 may be formed by drilling through the insulative material to the interior of the electrical connector 100. Once the access cavity 135 has been formed, the projection external conductive shield 160 at least partially surrounds the access cavity. The access cavity communicates the exterior of the electrical connector 100 with a conductive portion of the interior of the electrical connector, such as the interior of the conductor coupling assembly 110 located within the interior of the insulative body 140.

The insulative projection 130 includes two opposing ends 165, 170. The first end 165 of the insulative projection 130 is generally the area of the projection connected to or extending from the body portion 140. The second end 170 of the insulative projection 130 is located opposite from the first end 165 and away from the body portion 140. The opening 175 of the access cavity into the insulative projection 130 is located in the second end 170 of the projection.

The conductive external shield 145 and the projection conductive external shield 160 are typically electrically connected to ground such that they will dissipate any surface voltage on the external surface 180 of the insulative body 140 and the insulative projection 130. Although the insulative body 140 and the insulative projection 130 are formed from dielectric materials and are intended to prevent electric current from traveling through them, it is common for the external surface 180 of the insulation to develop a high voltage due to capacitive coupling. Contemplated dielectric materials include materials which are electrical insulators or in which an electric field can be sustained with a minimum dissipation of power. In general, a solid material is suitably dielectric if its valence band is full and is separated from its conduction band by at least 3 eV. Dielectric materials from which the body portion may be formed include, for example, EPDM.

All dielectric materials have some degree of conductivity, which generally increases with temperature and the electric field applied to the dielectric material. When used in high voltage electrical connectors, dielectric materials experience capacitive coupling, allowing a high voltage to form on the external surface 180 of the insulative body 140 and the insulative projection 130. This surface voltage problem may be further enhanced because of contaminants within the electrical connector 100. Because of this effect, the grounded conductive external shield 145 and the projection conductive external shield 160 abut the external surface 180 of the projection 130 and body 140 such that any voltage which may develop on them will be dissipated to ground. To achieve this end, the projection conductive external shield 160 extends from the body portion conductive external shield 145 at least to the second end 170 of the insulative projection 130. The projection conductive external shield 160 may extend above the second end 170 of the insulative projection 130.

Thus, because the projection conductive external shield 160 is fixedly secured to the body portion conductive external shield 145, the insulative projection 130 is not substantially exposed and any electric potential on the external surface 180 of the insulative bodies is not a problem, especially when attempting to gain access to the access cavity 135.

Water and other contaminants may enter the interior of the cable 105 through open ends of the cable during installation of the cable. Contaminants also may enter the interior of the cable through poorly sealed connection devices or joints, and by migrating through the insulation of the cable. Once contaminants enter the cable 105, they can migrate through the cable and enter the interior of the high voltage connector 100. These contaminants may damage the high voltage cable insulation. For example, they may react with the cable insulation and the electrical fields to form tree-shaped voids in the cable insulation. These voids can compromise the dielectric integrity of the cable insulation. Thus, access to the interior of the electrical connector 100 and connected cable 105 is provided by the access cavity 135 so that the contaminants may be removed and replaced with an insulating liquid to restore the insulative barrier and rejuvenate the dielectric areas within the high voltage electrical connector and high voltage cables.

The access cavity 135 is necessarily a small break in the grounded external shield of the electrical connector 100 and in the dielectric seal of the body portion 140. For this reason, the access cavity 135 must be dielectrically sealed and the grounded external shield must be completed when it is not necessary to have access to the interior of the electrical connector for testing or maintenance.

Figure 2:
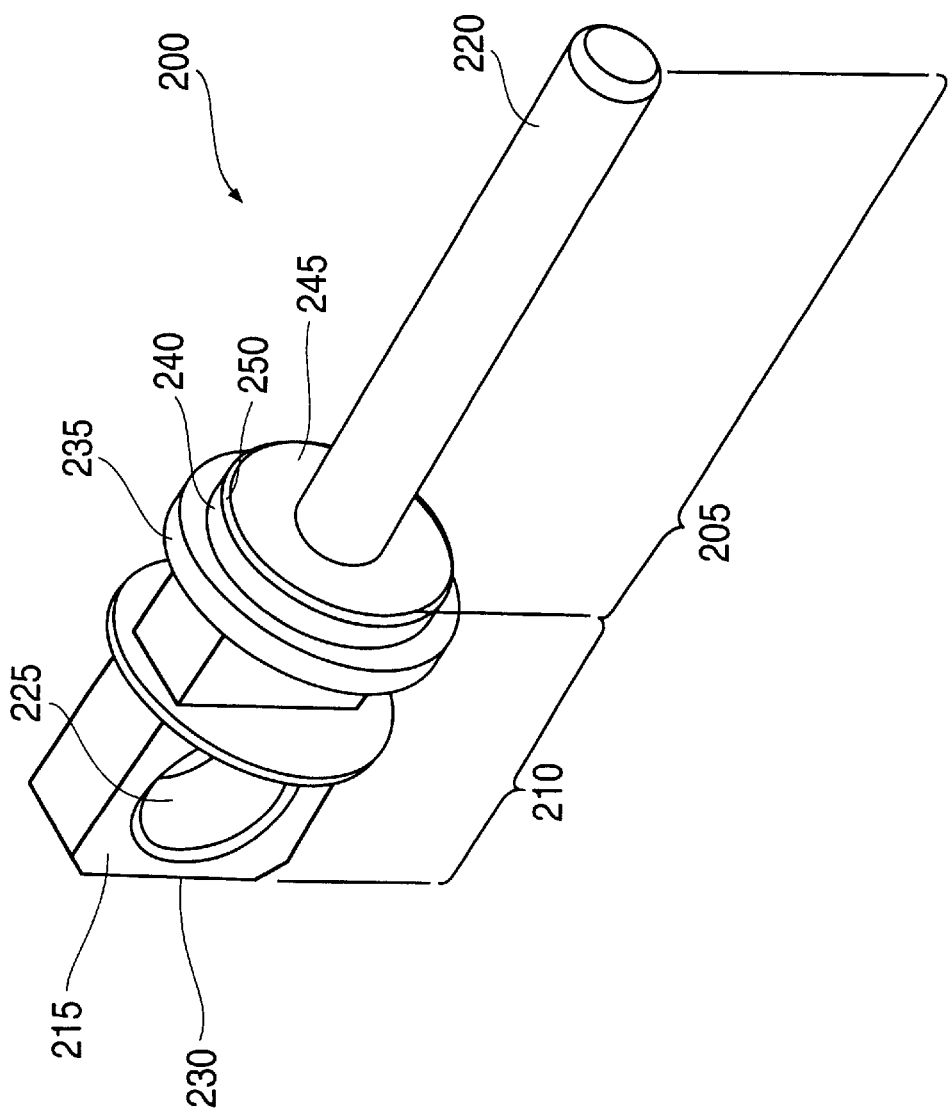
FIG. 2 is a perspective view of an insert.
Figure 3:
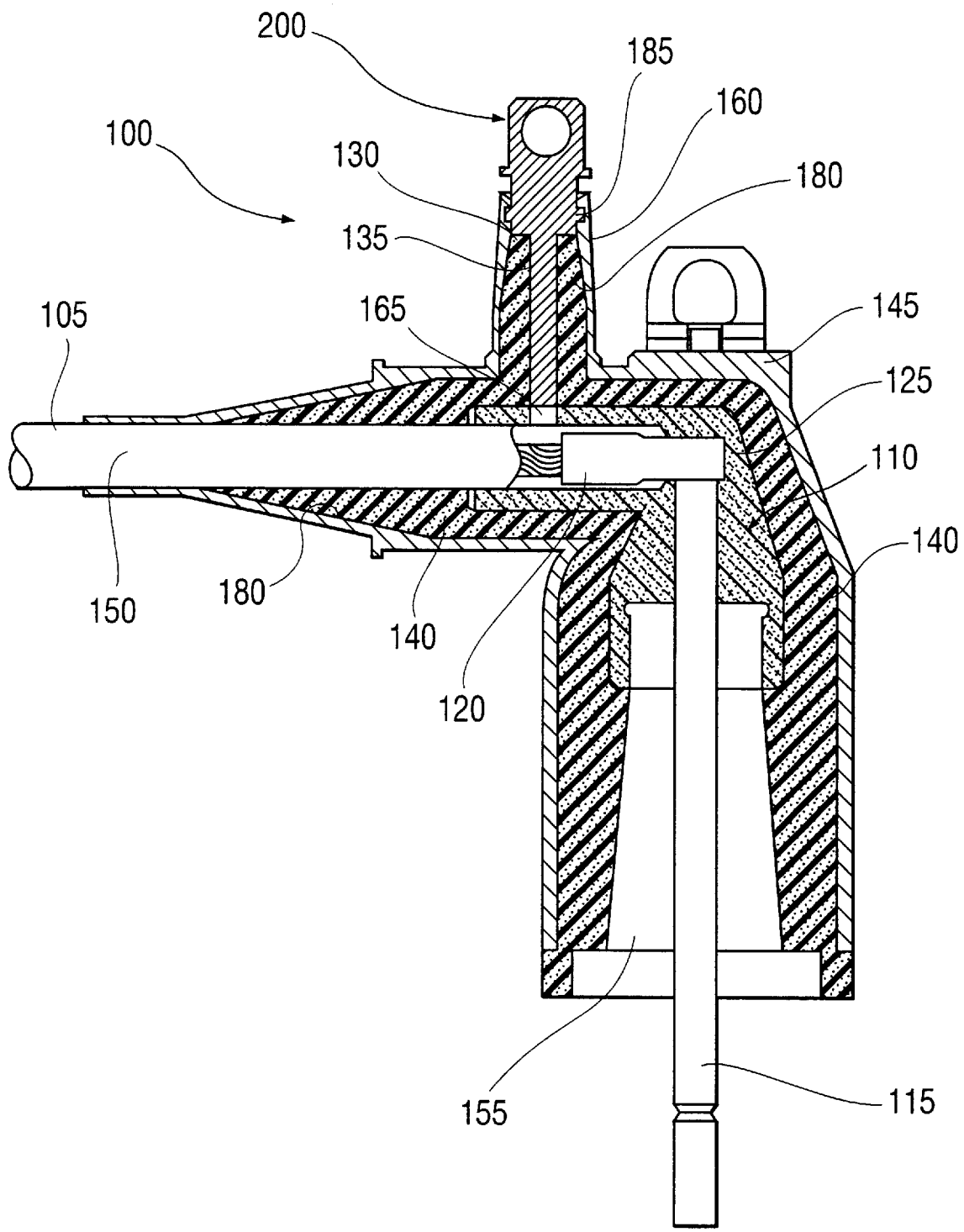
FIG. 3 is a side view of the high voltage connector of FIG. 1 with the insert of FIG. 2 in place.

Referring to FIGS. 2 and 3, an insert or insert plug 200 may be used to seal the access cavity 135. FIG. 3 illustrates the connector 100 with the plug 200 in place. The body of the insert 200, like the insulative body 140 and insulative projection 130, is formed from an insulative material. The body includes an insertion portion 205 and an exposed portion 210. The exposed portion 210 includes a head 215, and the insertion portion 205 includes a shaft 220 located opposite from the head 215. The shaft 220 is sized to be matingly received by the access cavity 135 of the electrical connector 100. Thus, the access cavity 135 may be dielectrically sealed by the shaft 220 by inserting the shaft into the access cavity such that the exterior surface of the shaft matingly engages the surface of the access cavity in an interference fit. This tight-fitting arrangement has two functions. First, the access cavity 135 is sealed to prevent materials from entering or exiting the interior of the electrical connector 100. Second, the continuity of the dielectric insulative projection 130 is restored. The shaft 220 and the head 215 extend along the longitudinal axis of the insert 200.

The exposed portion 210 of the insert also includes a hole 225 formed in the head 215 of the insert body which functions as a grasp by which the insert may be removed from the access cavity 135. The hole 225 is easily formed and is adapted for use with a "hot stick" well known in the art. The head 215 and the hole 225 also may be used to insert the shaft 220 into the access cavity 135. As illustrated in FIG. 2, the axis of the hole is perpendicular to the longitudinal axis of the insert 200. Other configurations for removing the insert shaft 220 from the cavity 135 are contemplated. For example, a hook, a loop, a screw, threads, a handle, a clasp, a finger, a digit, a grip, a grasp, a bow, a knob, a bar, a shaft, a bracket, a brace, or other means by which the insert 200 may be removed from the access cavity 58 are contemplated.

The exposed portion 210 includes a layer of conductive material or a conductive coating 230 bonded to the entire exterior surface of the exposed portion 210. That is, the conductive coating 230 is fixedly adhered to the exterior surface of the exposed portion so that it remains on the exterior surface indefinitely and is not readily removable. The conductive coating 230 may be sprayed on the exterior surface or deposited by any number of processes, such as painting or metalizing. The exposed portion 210 of the insert plug 200 includes all portions of the insert body that are exposed when the insertion portion 205 is received in the access port 135. It further includes a portion of a coupling member 235 to ensure a good electrical connection between the conductive coating 230 and the external shield 160 of the projection 130. Although the conductive coating 230 illustrated in FIG. 2 is fixedly adhered to the entire surface area of the exposed portion 210, it may be on only a portion of the exposed portion. For example, it may be desirable to leave a small portion of the exposed portion 210 free from any conductive coating for testing purposes.

The insert 200 includes the coupling member 225 for electrically coupling the conductive coating 230 with the projection conductive external shield 160, which is electrically coupled to the connector body conductive external shield 145. The coupling member 225 includes a radially extending cylindrical surface 240 which is received by a recess 185 incorporated in the insulative projection 130. The coupling member 235 is received by the recess 185 such that the conductive coating 230 on the radially extending cylindrical surface 240 and the coating on the coupling member 235 are in electrical contact with the projection conductive external shield 160 surrounding the access cavity 135. Thus, when the insert 200 is inserted into the access cavity 135 such that the coupling member 235 is received by the recess 185, the conductive coating 230 on the exposed portion 210 is electrically coupled to the shields 145 and 160 such that the conductive coating 230 is at ground potential when the shields 145, 160 are at ground potential. In this configuration, any surface voltage that may develop on the exterior surface of the insulative body of the insert due to capacitive coupling and any corona discharges arcing to the coating 230 are dissipated to ground.

As compared to conventional insert plugs, the insert 200 does not depend upon a separate conductive cap attached to an insulating rod because the conductive coating 230 is fixedly adhered to the exterior surface of the insert plug 200. This is advantageous because there is no risk that the conductive coating 230 may dislodge or separate from the insert 200, and the continuity of the electrical connection between the coating 230 and the insulative material of the insert 200 is uniform and stable. Furthermore, because the projection conductive shield 160 is fixedly secured to the connector body conductive external shield 140, not to the insert plug 200, the removal of the insert plug 200 does not cause the insulative projection 130 to be dangerously exposed without a conductive external shield. Thus, when the insert shaft 220 is removed from the access cavity 135, a ground shield, via the projection conductive shield 165, is still present on the insulative projection 130, except for at the second end 170 of the projection.

The conductive coating 230 is electrically coupled to the conductive surface of the electric connector (the access cavity conductive shield 160 and the body conductive external shield 140) by the coupling member 235, which is a snap-fit or latching ring type coupler. Other configurations and types of electrical connectors and couplers are contemplated as long as the couplers electrically couple the conductive coating with a conductive surface of the connector. For example, different fasteners such as mechanical threads, a screw, a pin, a snap, a wire, a latch, a hook, a buckle, conductive adhesive, or an interference fit may be used to electrically couple the conductive coating to the conductive surface of the connector.

Once the shaft 220 of the insert 200 is positioned in the access cavity and the coupling member is electrically coupled to the conductive surface of the connector, the flat surface 245 abuts against the insulative projection such that there is no air between the surface 245 and the insulative projection. Although the surface 245 is not coated, the beveled surface 250 between the flat surface 245 and the radial surface 240 is coated with the conductive coating 230 because it is also electrically coupled with the conductive surface of the electrical connector. Thus, the exposed portion 210 of the insert body includes portions that are electrically coupled with a conductive surface of the connector, although possibly not generally exposed to the external environment. The insertion portion 205 includes the element which forms a dielectric seal with the access cavity and the insulative projection.

Figure 5:
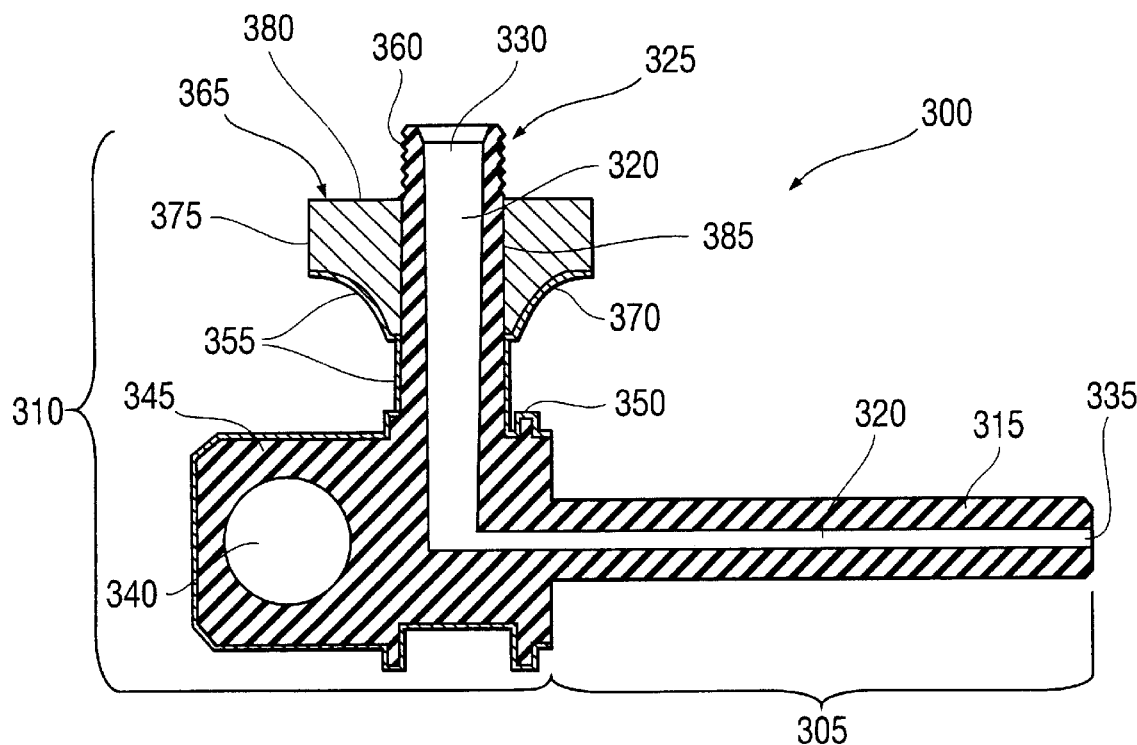
FIG. 5 is a sectional side view of the insert of FIG. 4.
Figure 4:
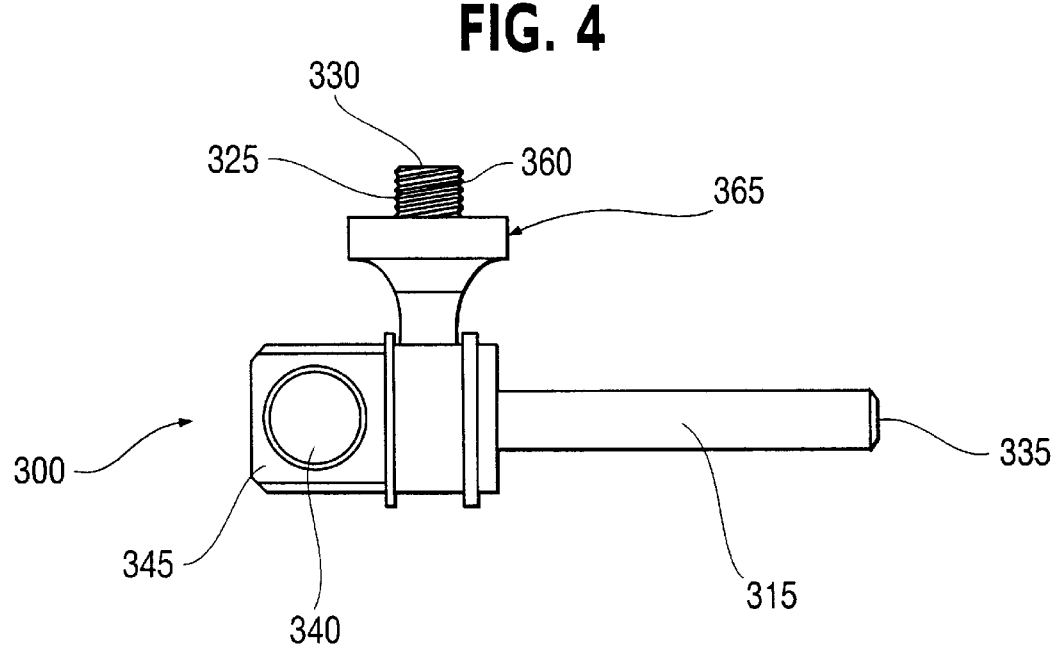
FIG. 4 is a side view of an insert.
Figure 6:
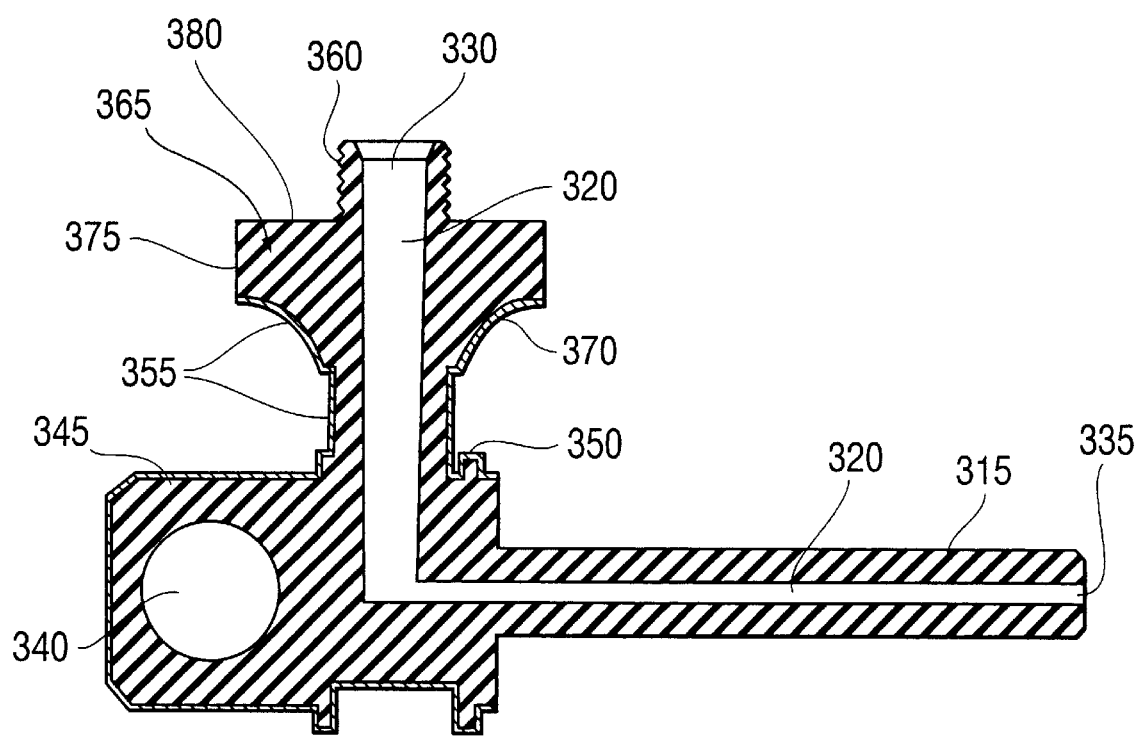
FIG. 6 is a sectional side view of a stress cone formed integrally with a shaft.
Figure 7:
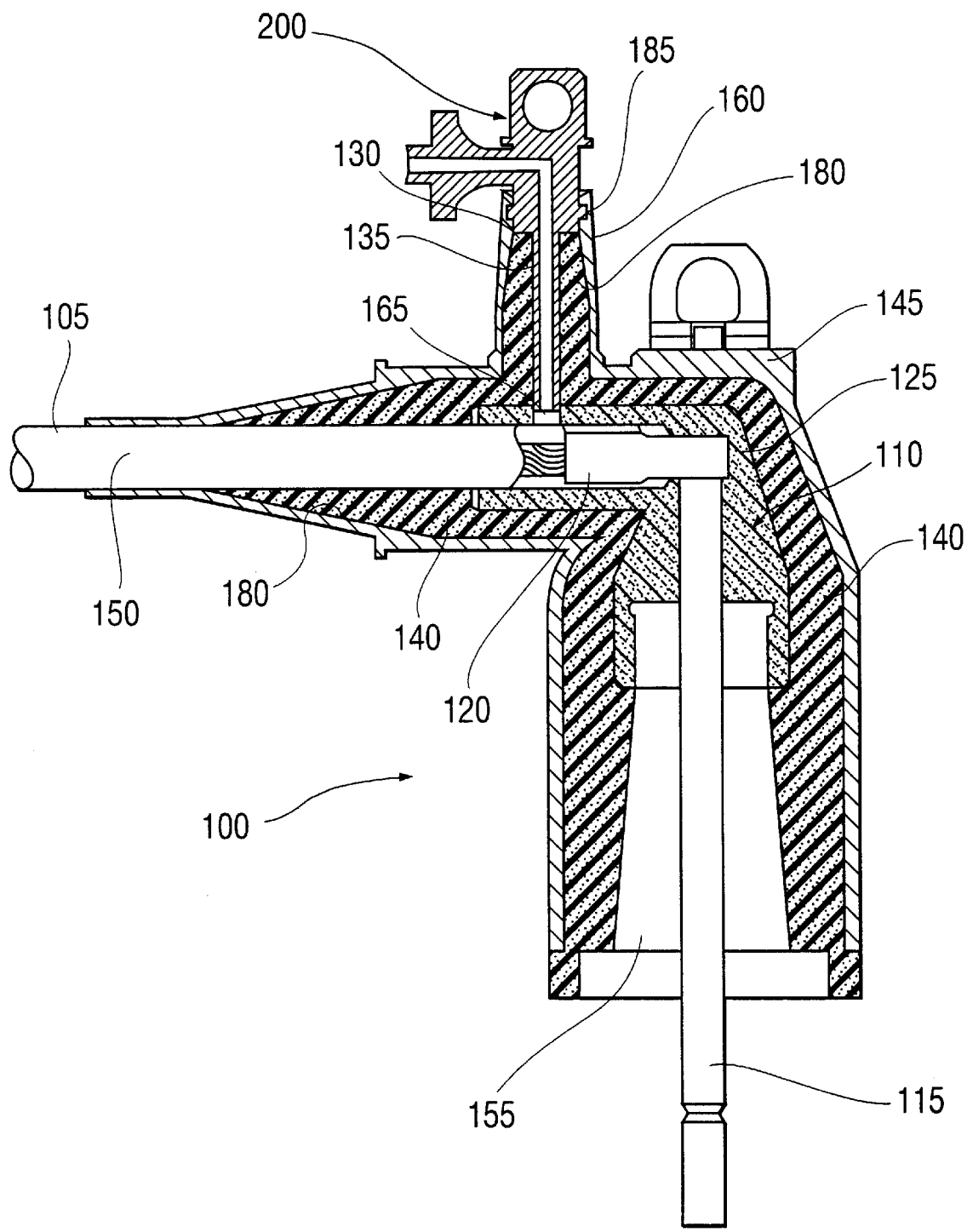
FIG. 7 is a side view of the high voltage connector of FIG. 1 with the insert of FIG. 4 in place.

FIGS. 4–6 illustrate an injection plug 300. FIG. 7 illustrates the high voltage electrical connector 100 with the injection plug 300 in place. The above discussion of the benefits and functions of the different components of the insert 200 also applies to the injection plug 300. However, as discussed below, the injection plug 300 includes many additional features and functions.

The body of the injection plug 300 is formed from an insulative material, and includes an insertion portion 305 and an exposed portion 310. As illustrated in FIG. 5, the insertion portion 305 and the exposed portion 310 are generally perpendicular to one another. However, other orientations are contemplated. The insertion portion 305 includes a shaft 315 sized to be matingly received by the access cavity 135 of the electrical connector 100. Thus, the access cavity 135 of the electrical connector 100 may be dielectrically sealed by the shaft 315 of the insertion portion by inserting the shaft into the access cavity such that the exterior surface of the shaft matingly engages the surface of the access cavity 135 in an interference fit. The injection plug 300 includes a continuous internal channel 320.

The body of the injection plug 300, like the insert 200, includes an exposed portion 310 and an insertion portion 305. The exposed portion 310 also includes an attachment portion 325. The channel 320 extends from an attachment opening 330 in the attachment portion 325 to an access opening 335 in the insertion portion 310. The channel may be used in removing fluids, such as liquids, gases and other contaminants, from the interior of the high voltage electrical connector 100. The channel also may be used for inserting fluids, such as insulating liquids, into the interior of the electrical connector 100.

The exposed portion 310 of the injection plug 300 also includes a hole 340 formed in the head 345 of the insert body and which functions as a grasp by which the insert may be removed from the access cavity. When the insert plug 200 shown in FIG. 2 is removed from the electrical connector 200 with the aid of the hole 225, the insertion portion 305 of the injection plug 300 may be inserted into the access cavity of the electrical connector. The external surface of the shaft 315 forms a dielectric seal with the interior surface of the access cavity, and a coupling member 350 electrically couples a conductive coating 355 on the exposed portion 310 with a conductive surface of the electrical connector. The coupling member 350 may be, for example, a snap-fit or latching-ring coupler.

The exposed portion 310 includes a conductive coating 355 bonded to the entire exterior surface of the exposed portion except for the attachment portion 325. However, the conductive coating may be on a lesser or greater surface area of the exposed portion.

The exposed portion 310 is that portion of the insert body that is not the insertion portion 305. The exposed portion 310 includes all portions of the insert body that are exposed when the insertion portion 305 is received in the access cavity. It further includes a portion of the coupling member 350 to ensure a good dielectric connection between the conductive coating 335 and the external shield 160 of the projection 130.

The injection plug 300 includes the coupling member 350 for electrically coupling the conductive coating 355 with the access cavity conductive external shield 160, which is in electrical communication with the connector body conductive external shield 145. The coupling member 350 cooperates with the recess 185 incorporated in the insulative projection 130. The coupling member 350 is received by the recess 185 such that the conductive coating 355 on the exposed portion 310 is in electrical contact with the conductive external shield 160 at least partially surrounding the access cavity 135. Thus, when the insertion portion 305 of the injection plug 300 is inserted into the access cavity 135 such that the coupling member 350 is received by the recess 185, the conductive surface 355 on the exterior portion 310 is electrically coupled to the shields 145 and 160. As such, the conductive coating 355 is at ground potential if the shields are at ground potential. Because the conductive surface of the exterior portion of the injection plug is at ground potential, any surface voltage that may develop on the exterior surface of the insulative body of the injection plug due to capacitive coupling and any corona discharges are dissipated to ground.

Conventional injection ports do not include conductive coating or shields of any sort, and, thus, do not prevent corona discharges from occurring. For example, when service personnel attempt to couple an injection line to a conventional injection port to remove contaminants from the interior of a high voltage electrical connector, the exterior surface of the conventional injection port may be at a voltage high enough to cause a corona discharge. The injection plug 300 reduces the chances of such corona discharges because at least a portion of the exterior surface of the exposed portion is covered with a conductive shield, such as the conductive coating 355.

In addition, the insulative projection and the access cavity formed therein are of a length sufficient to substantially prevent current flow or flash over from the conductive portion of the interior of the electrical connector through the access cavity. That is, the length of the access cavity is sufficient to prevent current flow from the interior of the electrical connector to exterior items. For example, in an embodiment of an electrical connector configured to accommodate 35 kV cables, the access cavity extends approximately 2.5 inches from the access opening 165 in the conductor coupling assembly 110.

Other conductive shields also may be used for the exposed portion 310 of the injection plug 300. For example, a conductive elastomeric cover or pre-molded cap may serve as the conductive shield for the injection plug 300.

The attachment portion 325 of the injection plug 300 is generally a male cylindrically shaped member or shaft having threads 360 for attaching a fluid transfer device, such as an injection line, to the attachment opening 330. Other attachment means, such as a snap-fit connector, an interference fit connector, a clamping device, a latch connector, a clasp device, or another device by which a fluid transfer device may be connected to the attachment portion 325 also may be used.

As shown in FIGS. 4 and 5, the exposed portion 310 of the injection plug 300 includes a stress cone 365 for minimizing corona or other electrical discharges. The stress cone 365 is generally located adjacent the attachment opening 330 because this is the area where corona discharges are most likely to occur, although the stress cone could be positioned elsewhere along the exposed portion 310. The stress cone 365 includes a curved conical surface 370 having a diameter that gradually increases towards the attachment opening 330. This changing diameter is located on an axis of a portion of the continuous internal channel 320 in the exposed portion 310. That is, if the attachment opening 330 faces vertically upward, the stress cone 365 is shaped like an upside-down bell. The stress cone 365 also includes a cylindrical surface 375 adjacent the curved conical surface 370, and a flat surface circular surface 380 located opposite from the curved conical surface such that the interior of the stress cone is a solid dielectric material. In other implementations, the stress cone may have a hollow interior. The stress cone is made from an insulating material and includes the surface coating along the conical curved surface, but not the cylindrical surface or the flat circular surface.

The stress cone is shaped and coated in this manner to shape any electric field which may form near the attachment opening 330 such that the electrical stress in the air in the region surrounding the attachment opening 330 is reduced. Thus, the shape and selection of the coating of the curved surface of the stress cone discourages or minimizes the occurrence of electrical discharges. Although the surface is conical and curved, other shapes are contemplated. For example, the surface may be conical or triangular. Other methods of reducing the electrical stress also are contemplated, including the use of high dielectric constant materials.

As illustrated in FIG. 5, the stress cone 365 may be a separate piece attached to a shaft 385 of the exposed portion. The stress cone may be attached to the shaft by any suitable method, such as welding, glue, adhesives, chemical bonding, an interference fit, rivets, bolts, and screws. Likewise, referring to FIG. 6, the stress cone may be integral with the shaft such that the entire body of the insert is one piece. The stress cone is part of the exposed portion. However, if the stress cone is formed separately, any conductive coating on the stress cone is electrically coupled with the conductive coating on the shaft of the exposed portion.

Figure 8:
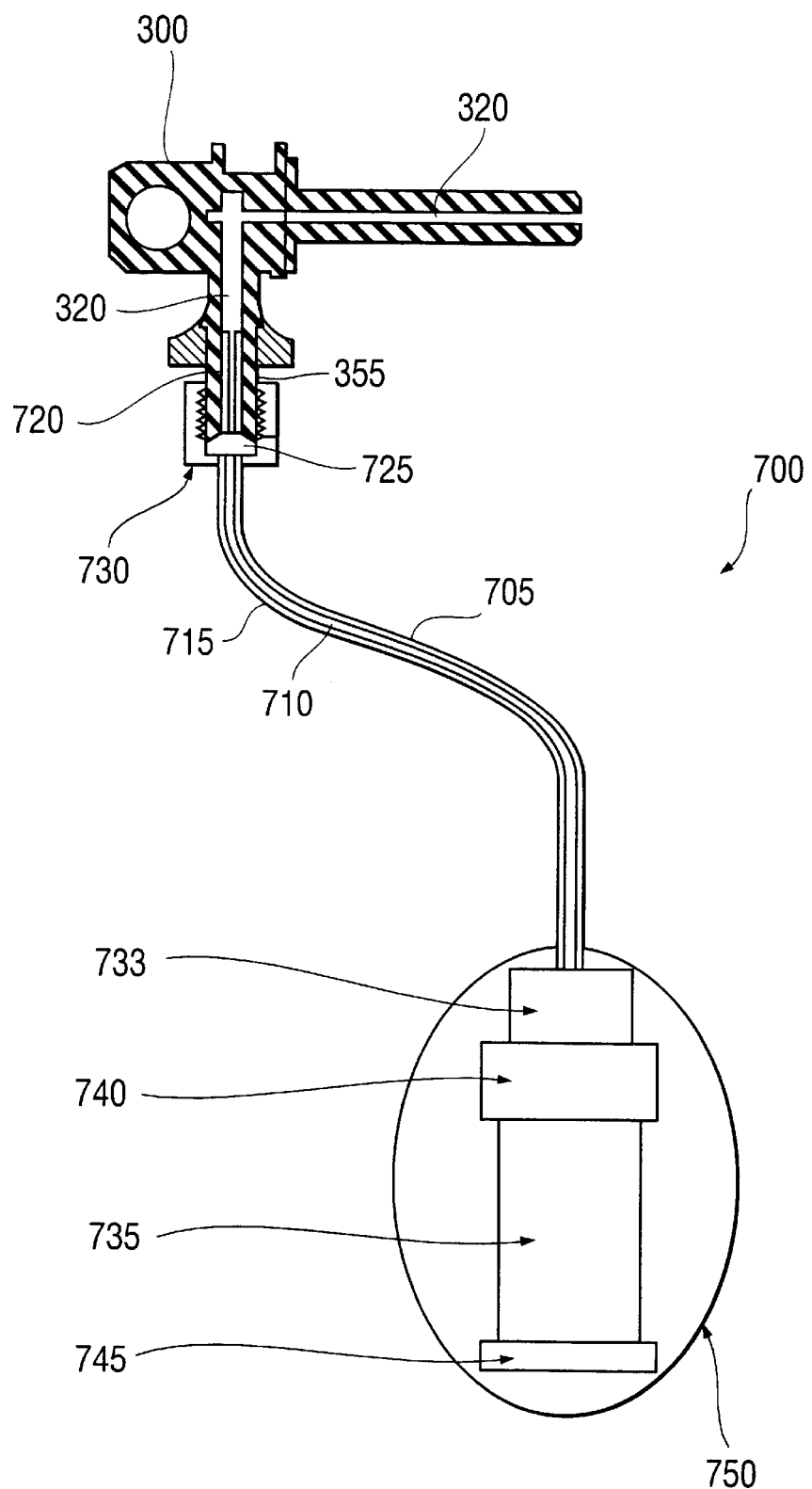
FIG. 8 is a block diagram of a dead front injection system.

Referring also to FIG. 8, the injection plug 300 may be used to implement a completely dead front system 700 for injecting fluids into, or removing fluids from, an electrical connector 100 (shown in FIG. 7) and an associated cable 105 (shown in FIG. 7). The system 700 may be used, for example, to inject specially formulated silicon-based fluids to enhance and improve the dielectric strength of the cable. Since the system 700 is completely dead front, there is no exposed voltage on the exterior of any of the parts during the process of filling the cable with fluid. This significantly reduces the risk of shock or injury to service personnel, or damage to equipment in proximity to the system 700.

The system includes tubing 705 connected to the injection plug 300. The tubing 705 includes an inner tube 710 made from a material having sufficient dielectric strength to withstand operating voltages. The inner tube 710 is surrounded by an external, flexible ground shield 715. The ground shield 715 can be a separate layer, such as those used in high voltage cables, or a coating, such as a paint or metallized coating.

When insulating cable fluid is in the inner tube 710 of the tube 705 and the internal channel 320 of the injection plug 300, there is no significant voltage inside the channel 320 or the inner tube 710, and the risk of shock, injury, or damage is negligible. However, during the filling process, when service personnel are working in close proximity to the equipment, the inner tube 710 and channel 320 may be filled with air, water, contaminated water, other conductive liquids, or combinations of these materials that are pushed out of the cable 105 by cable-curing liquids or other fluids, such as air or nitrogen gas, injected into the cable. Since these materials may be highly conductive, any voltage applied to the cable is transmitted through the inner diameter of the channel 320 and the inner tube 710. Through capacitive coupling, voltages in the inner tube 710, which may have values ranging from 2 kV to 35 kV, will induce comparable voltages on the outside of the inner tube 710. The ground shield 715 serves to safely drain this voltage to ground and maintain a "dead front" or grounded surface on the exterior of the tube 705.

As noted above, the injection plug 300 includes a conductive coating 355 applied to exterior surfaces in certain areas. This conductive coating serves as a ground shield for the injection plug 300 and is electrically connected to the conductive coating on the connector 100. As also noted, the injection plug is made from materials that are insulating and can withstand voltage. All internal plug surfaces contacted by the fluid are insulating.

The tube 705 is connected to the injection plug 300 by inserting an end of the tube 705 into the channel 320 of the attachment portion 325. The portion 720 of the tube 705 that is inserted into the injection plug 300 does not include the ground shield 715. A tapered collar 725 passes over the tube and mates with the end of the attachment portion 325 to create a seal between the collar 725 and the attachment portion 325.

The portion 720 of the tube for which the ground shield is removed and the inside of the injection plug must withstand any applied voltage. The dielectric region established in this area is a function of the interference fit between the flexible tube and the rigid injection plug. If needed, this dielectric region may be augmented by adhesives or other coatings, such as epoxies applied between the outside of the tube and the inside of the injection plug end.

A conductive nut 730 holds the collar 725 in place on the attachment portion to ensure a seal between the injection plug 300 and the tube 705. The nut is made from a conductive material, or from an insulating material, such as plastic, coated with a conductive layer. The collar 725 may be insulating or conductive.

The other end of the tube 705 is connected through a pumping/valving system 733 to a chamber 735. The chamber 735 is hermetically sealed and includes a top cap 740 and a bottom cap 745. The chamber and caps are made from insulating materials. Valves of the pumping/valving system 733 are made from brass or other metallic castings and parts. A pump housing of the pumping/valving system 733 is made from insulating materials.

The pumping/valving system 733 and the chamber 735, including the caps 740, 745, are placed in a conductive container 750. The conductive container may be, for example, a metal mesh container, box, cylinder or bag. The container may be flexible or rigid. The conductive container 750 is connected to the ground shield 715 of the tube 705 to keep the conductive container 750 at ground potential, and to thereby dissipate to ground any charges capacitively coupled to exterior surfaces of the chamber 735, the caps 740, 745, or insulated components of the pumping/valving system 733. The metal components of the pumping/valving system 733 are physically and electrically isolated from the grounded container 750 to prevent current flow from the metal components to ground.

The outside surfaces of the sack, tube, and elbows are grounded through the elbow ground or other connections to the system ground. This eliminates the risk of shock from casual contact. One drawback of this approach is that the components in the ground sack can build considerable surface charges at higher voltages. These surface charges can result in discharges between the grounded sack and the components inside. With proper insulation, these discharges will not harm the components. However, they may create an undesirable visible and audible display.

To avoid this potential problem, all components in the ground sack can be provided with conductive, integral ground shields that drain off any surface charge, and do so without visible or audible display. These ground shields may be used in addition to the container 750, or in lieu of the container 750, and may be implemented as conductive coatings, such as are discussed above.

When the system 700 is used to draw contaminants or other fluids from the connector 100, the pumping/valving system 733 exerts a negative pressure in the tube 705. This may be accomplished by evacuating the chamber prior to positioning the injection plug 300 in the connector, in which case the pumping/valve system 733 only needs to include passive valve components, or by including active pumping components in the pumping/valve system 733.

When the system 700 is used to inject fluids, such as fluids for enhancing and improving the dielectric strength of the cable, the pumping/valving system 733 exerts a positive pressure in the tube 705. This may be accomplished by using an external pump to pressurize the chamber prior to positioning the injection plug 300 in the connector, or by including active pumping components in the pumping/valve system 733.

In many applications, a pressurized system 700 is connected to a connector 100 at one end of a cable 105 and an evacuated system 700 is connected to a connector 100 at an opposite end of the cable 105. The two systems then are operated in concert so that fluid from the pressurized system pushes contaminants out of the cable and into the chamber of the evacuated system. In particular, the fluid flows from the pressurized jar, through the cable, and into the evacuated jar. As the fluid flows through the cable, the fluid forces any liquids or other materials through the cable and into the evacuated jar.

The system 700 enables a safer process for injecting cable curing liquids or other materials into the elbow. The improved, safer process results from preparing all parts, pressurizing or evacuating the cylinders, and then plugging the injection port into the projection on the elbow. This approach creates a completely shielded, dead front, fluid injection system.

Other embodiments are within the scope of the following claims.

What is claimed is:

1. A dead front system for providing fluid access to an electrical connector and cable, the system comprising:
   an injection plug;
   a fluid access system comprised of a pumping/valving system;
   a tube connected at a first end to the injection plug and at a second end to the fluid access system, and
   a conductive container for containing the fluid access system;
   wherein the injection plug, fluid access system, and tube are surrounded by a conductive, grounded surface and the conductive, grounded surface is electrically coupled to the conductive container.

2. The dead front system of claim 1, wherein the conductive container comprises a metal mesh container.

3. The dead front system of claim 2, wherein the conductive container is flexible.

4. The dead front system of claim 2, wherein the conductive container is rigid.

5. The dead front system of claim 2, wherein the conductive container comprises a bag.

6. The dead front system of claim 1, wherein the conductive, grounded surface further comprises a conductive surface formed on outer surfaces of the injection plug and the tube.

7. The dead front system of claim 6, wherein the conductive surface comprises a coating.

8. The dead front system of claim 1, wherein the conductive, grounded surface further comprises a conductive surface formed on outer surfaces of the injection plug and the tube.

9. The dead front system of claim 8, wherein the conductive surface comprising a coating.

10. The dead front system of claim 8, wherein the conductive outer surface is removed from a portion of the first end of the tube that is inserted into a channel in the injection plug.

11. The dead front system of claim 10, wherein the injection plug is further comprised of a channel and the connection between the tube and channel includes a coating between the inserted portion of the first end of the tube and the channel.

12. The dead front system of claim 11, wherein the coating comprises an adhesive.

13. The dead front system of claim 1, further comprising a tapered collar surrounding the tube and a conductive nut configured to secure the tapered collar and the tube to the injection plug, wherein the tapered collar forms a seal against the injection plug.

14. The dead front system of claim 13, wherein the conductive nut comprises an insulating plastic coated with a conductive layer.

15. The deadfront system of claim 1, wherein the fluid access system further comprises:
   a chamber made from an insulative material coupled to the pumping/valving system; and
   a housing surrounding the pumping/valving system made from an insulative material.

16. The dead front system of claim 15, wherein the conductive grounded surface comprises a conductive sack.

17. The dead front system of claim 16, wherein the conductive grounded surface further comprises a conductive surface formed on outer surfaces of the injection plug and the tube.

18. The dead front system of claim 17, wherein the conductive surface and the conductive container are connected to a system ground.

19. The dead front system of claim 18, wherein the chamber and the housing include integral ground shields connected to the system ground.

20. The dead front system of claim 19, wherein the integral ground shields comprise conductive coatings.

21. The dead front system of claim 15, wherein the chamber and the housing include integral ground shields connected to a system ground.

22. The dead front system of claim 21, wherein the integral ground shields comprise conductive coatings.

23. A method of installing a dead front system to a high voltage electrical connector comprising:

providing a dead front system comprising an injection plug, a fluid access system comprised of pumping/valving system that is placed inside a conductive container, and a tube connected at a first end to the injection plug and at a second end to the fluid access system, wherein the injection plug and tube are surrounded by a conductive, grounded surface;

providing a high voltage electrical connector; and inserting the injection plug into an opening in the high voltage electrical connector.

24. The method of claim 23, wherein the fluid access system further comprises:

a chamber made from an insulative material coupled to the pumping/valving system; and a housing surrounding the pumping/valving system and made from an insulative material.

25. The method of claim 24, wherein the conductive, grounded surface further comprises a conductive surface formed on outer surfaces of the injection plug and the tube.

26. The method of claim 25, wherein the conductive container is connected to the conductive surface and the conductive surface and the conductive container are connected to a system ground.

27. The method of claim 26, wherein the chamber and the housing include integral ground shields connected to the system ground.

28. The method of claim 27, wherein the integral ground shields comprise conductive coatings.

29. The method of claim 24, wherein the chamber and the housing include integral ground shields connected to a system ground.

30. The method of claim 29, wherein the integral ground shields comprise conductive coatings.

31. A dead front system for providing fluid access to an electrical connector and cable, the system comprising:

means for providing access to the electrical connector;

means for pumping fluid;

means for connecting the means for providing access to means for pumping so that material can be carried between the means for providing access and the means for pumping fluid;

first conductive means for covering the means for providing access;

second conductive means, coupled to the first conductive means; for covering the pumping means; and third conductive means for covering the means for connecting.

* * * * *